June 4, 1929.  E. G. GUINN  1,716,226
BOLTLESS FISH PLATE AND JOINT CONSTRUCTION
Filed Jan. 24, 1929   2 Sheets-Sheet 2
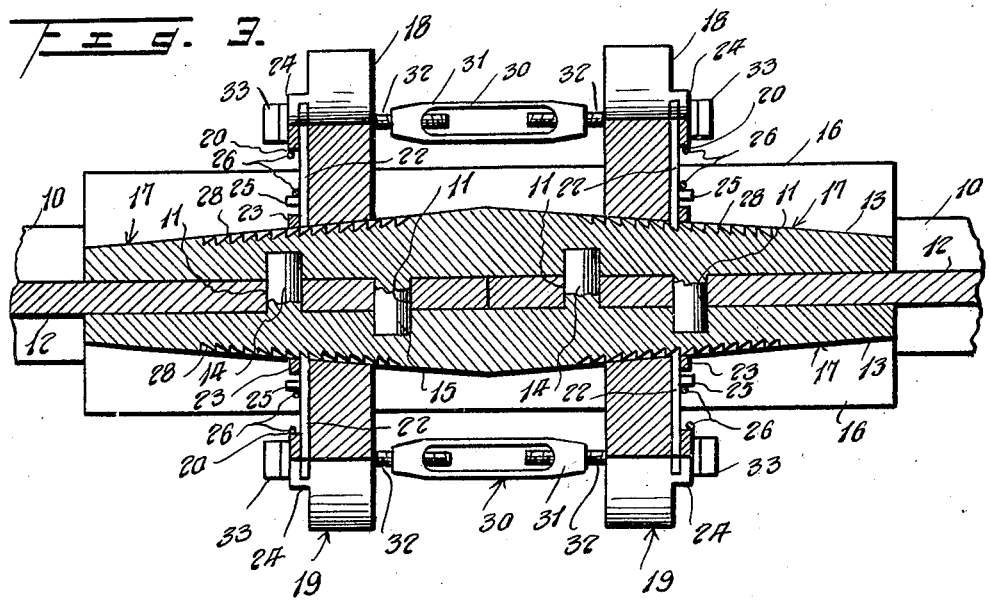
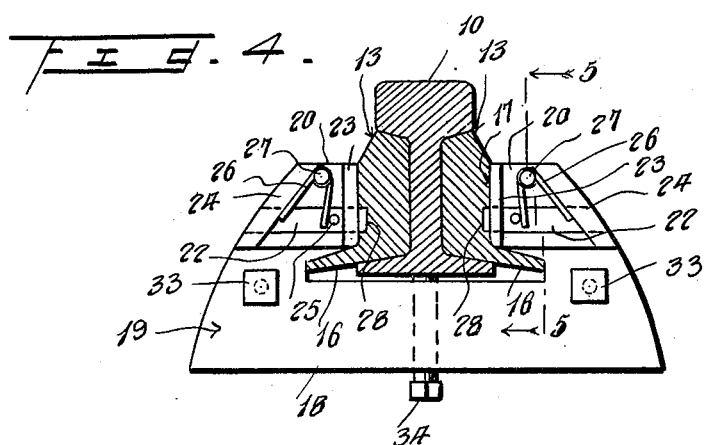
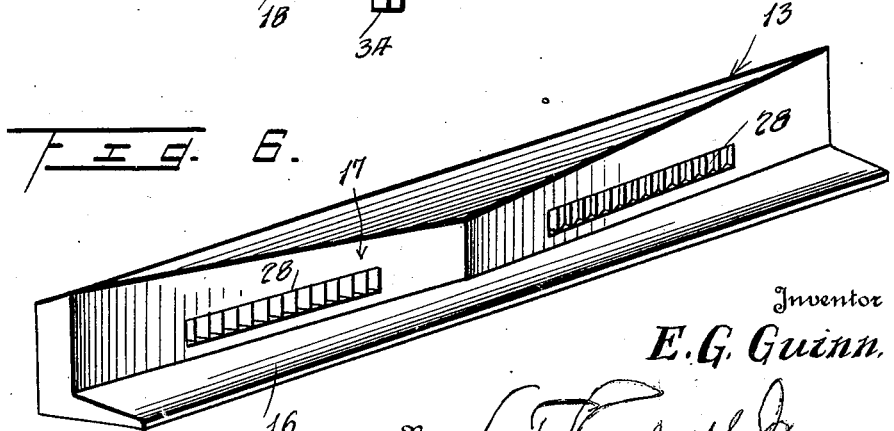
Inventor
E. G. Guinn.
Attorney Patented June 4, 1929.

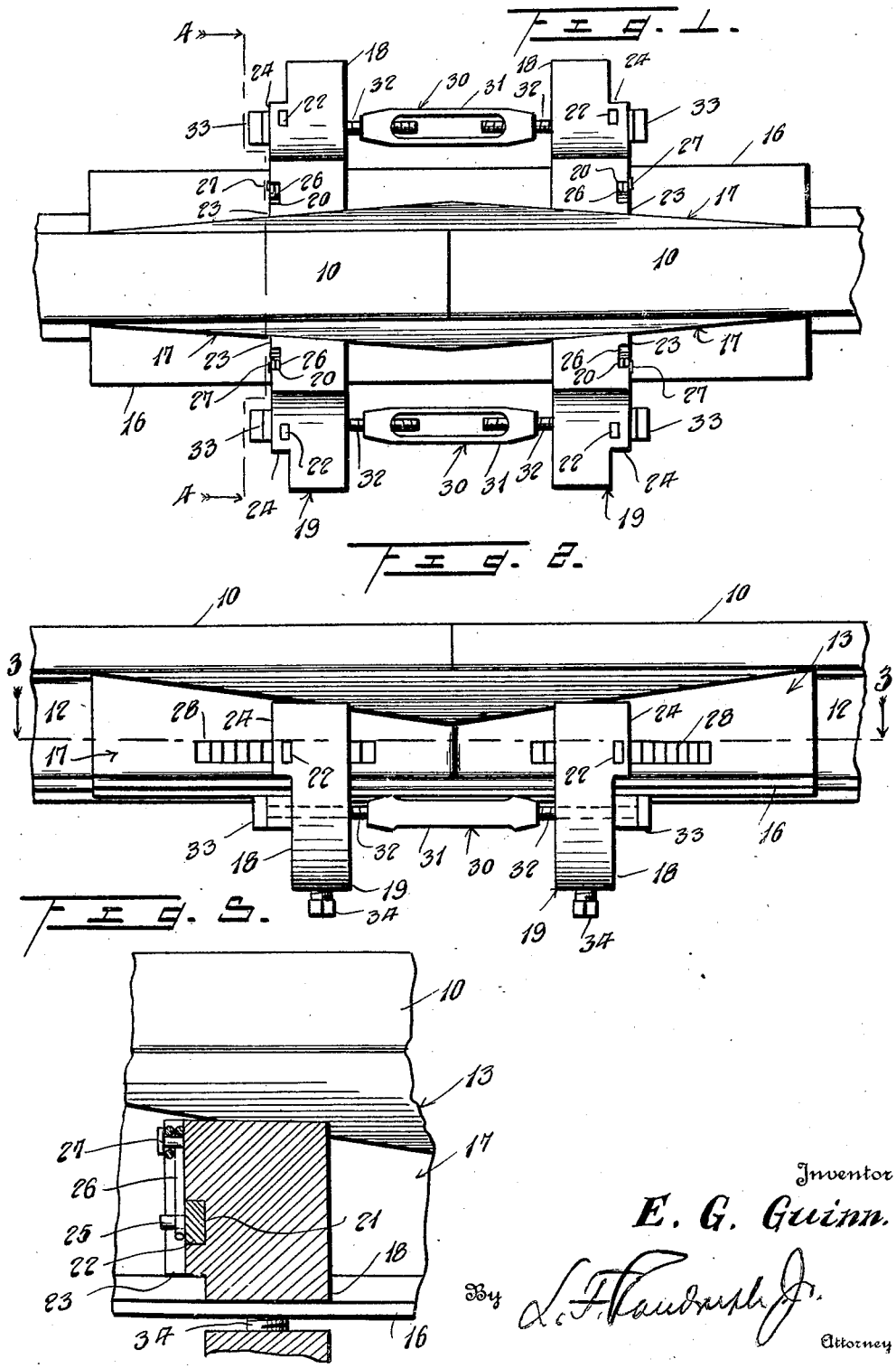

1,716,226

UNITED STATES PATENT OFFICE.

EDWARD G. GUINN, OF DICKSON CITY, PENNSYLVANIA.

BOLTLESS FISHPLATE AND JOINT CONSTRUCTION.

Application filed January 24, 1929. Serial No. 334,763.

This invention relates to a joint for railway rails.

It is aimed to provide an improved, relatively simple and inexpensive construction whereby fish plates will not require bolts for their fastening to the rails and wherein the fish plates will be effectively clamped against the rails, holding the latter in line, and generally reenforcing the joint.

The more specific objects and advantages will become apparent and in part be pointed out in the description following which is to be taken in connection with accompanying drawings illustrating an operative embodiment.

In said drawings:—

Figure 1 is a plan view of a rail joint embodying the invention,

Figure 2 is a side elevation of the joint,

Figure 3 is a horizontal sectional view taken on the line 3—3 of Figure 2,

Figure 4 is a vertical sectional view taken on the line 4—4 of Figure 1,

Figure 5 is a vertical sectional view taken on the line 5—5 of Figure 4, and

Figure 6 is a detail perspective view of one of the fish plates.

Referring specifically to the drawings, the meeting ends of two conventional railway rails are shown at 10, being provided as usual, with bolt holes 11 through the webs 12 thereof.

Against opposite sides of the rails 10, fish plates 13 of the form shown in perspective in Figure 6, are disposed, such fish plates having integral studs 14 thereon which pass through the holes 11, instead of the usual bolts, and enter sockets 15 in the companion fish plate 13. It will be seen from a consideration of Figure 3, that the lugs or studs 14 are arranged to extend alternately from the two fish plates.

Such fish plates 13 have base flanges 16 which rest on the base flanges of the rails 10 and they also have external inclined or cam surfaces 17 which extend from the ends of the fish plates outwardly toward and meet at the center of the plates, which is in transverse alinement with the meeting ends of the rails 10, as best shown in Figure 3.

Clamps 18 are employed to securely hold the fish plates against the rails. Preferably a pair of the clamps is used in connection with each pair of fish plates or each rail joint. Each clamp comprises a clamp body 19 generally of U or yoke shape so as to extend under the rails 10 and have terminals 20 overlapping the flanges 16. Transversely slidable in suitable grooves 21 in the terminal portions 20, are latch bars 22 which are held against lateral displacement by cross members 23 and 24 rigid with the terminals. Such latches 22 each have a pin 25 and expansive springs generally of U-shape 26 have one terminal engaging strips 24 and the pins 25, to urge latches toward the fish plates. The springs 26 are mounted on studs 27 fastened to the terminals 20.

Each face 17 is provided with a series of ratchet teeth 28 which are engaged by the latches 22, the latches 22 automatically slipping over the teeth 28 as the clamps 18 are drawn toward each other and thus toward the meeting ends of the rails 10.

Any suitable means may be used for moving the clamps 18 into place. They may be driven by sledge hammers or otherwise or as shown in the drawings, turn buckles 30 form an efficient means to accomplish this end. The turn buckles consist of buckle members 31 having screw threaded engagement with the oppositely screw threaded bolts 32 which removably pass through the clamps 18, each bolt having a head 33 preventing complete passage of the bolts through the clamps and causing the clamps to move as the turn buckles are adjusted. Attention is called to the fact that the turn buckles may be permanently associated with the clamps but if desired, the same may be removed simply by disengaging the bolts 32 and buckle member 31, so that the turn buckle may be applied to other uses.

A stout screw or bolt 34 is threaded to each clamp and adapted for engagement with the under surfaces of the rails, aiding in positioning the clamps and especially in binding the same in place if the turn buckles or other parts should break.

Various changes may be resorted to provided they fall within the spirit and scope of the invention.

I claim as my invention:—

1. In combination with the meeting ends of rails, fish plates applied against opposite sides of the rails, said fish plates having cam surfaces extending from the ends thereof towards their centers, clamp means movable along the fish plates toward each other and arranged in engagement with said cam surfaces, said cam surfaces being provided with ratchet teeth, and spring actuated latches slidably mounted on the clamps and engageable with said teeth.

2. In combination with the meeting ends of rails, fish plates applied against opposite sides of the rails, said fish plates having cam surfaces extending from the ends thereof towards their centers, clamp means movable along the fish plates toward each other and arranged in engagement with said cam surfaces, said cam surfaces being provided with ratchet teeth, spring actuated latches slidably mounted on the clamps and engageable with said teeth, and means operable to draw said clamps toward each other.

3. In combination with the meeting ends of rails, fish plates applied against opposite sides of the rails, said fish plates having cam surfaces extending from the ends thereof towards their centers, clamp means movable along the fish plates toward each other and arranged in engagement with said cam surfaces, said cam surfaces being provided with ratchet teeth, latch means on the clamps engageable with said teeth, means operable to draw said clamps toward each other, set screws carried vertically by the clamps and engaging the under surfaces of the rails, and said latch means comprising latch members, said clamps having terminal portions extending across the flanges of the fish plates and provided with slots in which the latch members are slidable, strips on the terminals extending across the latch members, and spring means engaging the latch members to urge them toward said ratchet teeth.

In testimony whereof I affix my signature.

EDWARD G. GUINN.